United States Patent
Pleiman et al.

(10) Patent No.: US 12,244,906 B1
(45) Date of Patent: Mar. 4, 2025

(54) SYSTEMS AND METHODS FOR AUTOMATIC CONTROL OF TELEVISION OR MEDIA DEVICE VIA A SET TOP BOX

(71) Applicant: DISH Network L.L.C., Englewood, CO (US)

(72) Inventors: Eric Pleiman, Centennial, CO (US); Andrew Pleiman, Centennial, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 18/460,145

(22) Filed: Sep. 1, 2023

(51) Int. Cl.
*H04N 21/485* (2011.01)
*H04N 21/475* (2011.01)

(52) U.S. Cl.
CPC ......... *H04N 21/485* (2013.01); *H04N 21/475* (2013.01)

(58) Field of Classification Search
None
See application file for complete search history.

(56) References Cited

U.S. PATENT DOCUMENTS

| | | | | |
|---|---|---|---|---|
| 2013/0331087 A1* | 12/2013 | Shoemaker | ......... | H04L 12/2829 455/420 |
| 2015/0163412 A1* | 6/2015 | Holley | ................. | G08B 25/008 348/143 |
| 2017/0061779 A1* | 3/2017 | Kennedy | ................. | G08B 13/08 |
| 2017/0324577 A1* | 11/2017 | Warren | ............... | H04L 12/2803 |

* cited by examiner

Primary Examiner — Junior O Mendoza
(74) Attorney, Agent, or Firm — Seed IP Law Group LLP (57) ABSTRACT

A media device control system is provided herein. The media device control system receives a first indication of a geographic location of a set-top box associated with a user and receives a second indication of data representing one or more vacation time periods based on the geographic location. The media device control system determines that the user is predicted to be on vacation within a period of time based on the data representing the one or more vacation time periods and the geographic location. The media device control system receives user input confirming that the user will go on vacation within the period of time. The media device control system causes the set-top box to transmit signals to activate a television during the period of time based on the user input indicating that the user will go on vacation within the period of time.

20 Claims, 6 Drawing Sheets

300 vacation data data table

| Entity | Vacation Times |
|---|---|
| User 1 | August 22-28; December 18-28; May 3-10;... |
| School | June 6 – August 17; November 22-29; December 20 – January 10; March 20-27;... |
| Government | July 4; September 3; November 11; November 25; December 24-25;... |
| User 2 | June 20-29; January 1-20; December 2-15;... |
| ... | ... |

301 — User 1 row
302 — School row
303 — Government row
304 — User 2 row
312 — Entity column
313 — Vacation Times column

SYSTEMS AND METHODS FOR AUTOMATIC CONTROL OF TELEVISION OR MEDIA DEVICE VIA A SET TOP BOX

BACKGROUND

A common method to deter intruders is to leave the lights on in a home while the occupants are away, such as on a vacation or other type of trip. By leaving the lights on in the home, or by scheduling the lights to turn on and off at certain times, the illusion that the home is occupied is maintained and potential intruders may be turned away. It is with respect to these and other considerations that the embodiments described herein have been made.

BRIEF SUMMARY

The embodiments disclosed herein improve the technology of home intruder prevention by providing a technical solution that automatically controls media devices, such as televisions, sound systems, radios, and other devices, while an occupant is away from their home. The embodiments disclosed herein may predict whether an occupant of the home will be away from their home at a future time. The embodiments disclosed herein transmit signals to one or more media devices in the home to control the media devices during the future time in order to give the illusion that the home is occupied.

In some embodiments, a media device control system receives an indication of a geographic location of a set-top box associated with a user. The media device control system may receive a second indication of data representing one or more vacation time periods based on the geographic location. The media device control system may determine that the user is predicted to be on vacation within a period of time based on the data representing the one or more vacation time periods and the geographic location. The media device control system may receive user input indicating that the user will go on vacation within the period of time based on the determination that the user is predicted to be on vacation within the period of time. During the period of time, the media device control system may cause the set-top box to transmit one or more signals activating a television based on the user input indicating that the user will go on vacation within the period of time.

In some embodiments, to cause a set-top box to transmit one or more signals, the media device control system accesses television viewing history of the user. The media device control system may select one or more media channels based on the television viewing history of the user. The media device control system may transmit one or more signals to the television to cause the television to display the selected one or more media channels.

In some embodiments, the media device control system trains a machine learning model to predict whether the user will be on vacation based on data representing vacation time periods.

In some embodiments, to determine that the user is predicted to be on vacation within the period of time, the media device control system applies a period of time to the machine learning model to obtain a prediction of whether the user will be on vacation within the period of time.

In some embodiments, to receive the second indication of data representing one or more vacation time periods, the media device control system identifies one or more entities based on the geographic location. The media device control system may, for each entity of the one or more entities, access data representing one or more time periods during which the entity will be closed.

In some embodiments, to receive the second indication of data representing one or more vacation time periods, the media device control system identifies one or more other users based on the geographic location. The media device control system may, for each respective user of the one or more users, access data representing one or more time periods during which the respective user will be on vacation.

In some embodiments, the media device control system transmits a test signal to the television. The media device control system may determine whether the test signal was received by the television.

In some embodiments, the media device control system, based on a determination that the test signal was not received by the television, presents a prompt to a user to change one or more settings of the television. The media device control system may re-transmit the test signal to the television.

In some embodiments, the media device control system, based on a determination that the signal was not received by the television, the media device control system identifies a remote-control device that is able to transmit signals to control the television. The media device control system may transmit one or more signals to activate the television by causing the set-top box to transmit instructions to the remote-control device to transmit one or more signals to the television.

In some embodiments, the media device control system, in response to a determination that the user is predicted to be on vacation within a period of time, provides an inquire to the user requesting confirmation that the user will be on vacation within the period of time.

DETAILED DESCRIPTION

Occupants of a home typically take various actions to deter intruders when the occupants are away from their home. One such method of deterring intruders includes making the home appear to be occupied, such as by leaving lights on or setting lights on a timer. By doing this, potential intruders are given the impression that a home is occupied when the occupants are away.

Although leaving lights on in a home while an occupant is away is a common strategy for giving potential intruders the impression that a home is occupied, there are drawbacks to this strategy. For example, a potential intruder who observes the home for a period of time will see that there is no other activity, and that there are no other devices being used, in the home, and will be able to know that the home is unoccupied. As another example, if an occupant does not remember to prepare the lights or other devices so that they are on while the occupant is away from their home, the lights will not turn on to give the impression that the home is occupied.

The embodiments disclosed herein address the issues above and thus help solve the above technical problems and improve the technology of home security by providing a technical solution that determines whether an occupant likely to be away from home, and that automatically controls media devices while the occupant is away. The embodiments disclosed herein are further able to be used to configure media devices such that they are able to be automatically controlled by a receiving device when the occupant is away from home. The embodiments disclosed herein are further able to train and use a machine learning model to predict whether an occupant is likely to be away from home at a future period of time.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed to include "and/or" unless the content clearly dictates otherwise. The term "and/or" is generally employed to include an inclusive or.

The headings and Abstract of the Disclosure provided herein are for convenience only and do not interpret the scope or meaning of the embodiments.

Figure 1:
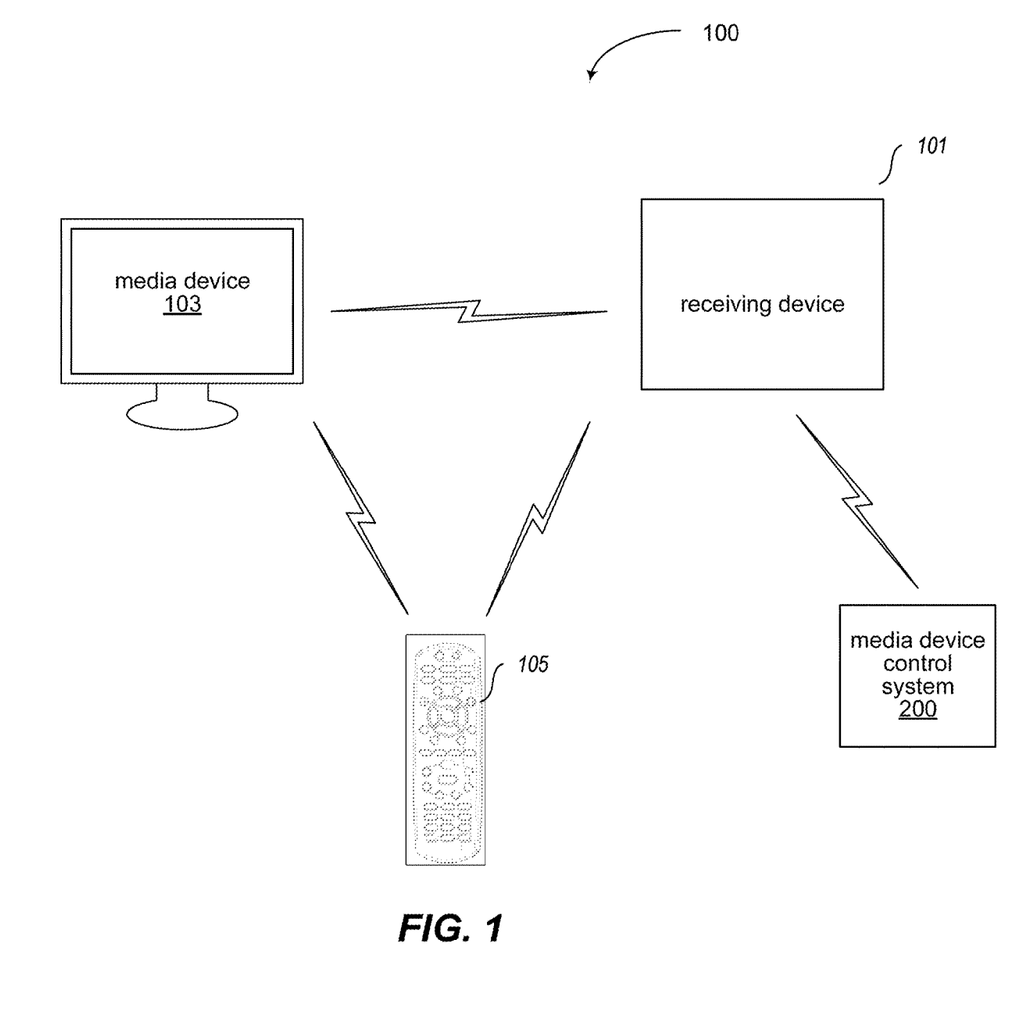
FIG. 1 is a display diagram depicting a sample environment 100 in which a media device control system 200 operates, according to various embodiments described herein.

FIG. 1 is a display diagram depicting a sample environment 100 in which a media device control system 200 operates, according to various embodiments described herein. The environment 100 includes a receiving device 101, a media device 103, and a remote-control device 105. The environment 100 is one instance of an environment in which the media device control system 200 may operate, and the media device control system 200 may operate in other environments. Moreover, the media device control system 200, its functionality, or some combination thereof, may be included in one or more of the devices described in FIG. 1, or in other computing devices not illustrated in FIG. 1. The media device control system 200 is discussed below, in connection with FIG. 2.

Audio, video, and/or data service providers (not illustrated), such as, but not limited to, television service providers, provide their customers a multitude of audio/video and/or data programming (hereafter, collectively and/or exclusively "programming"). Such programming is often provided to a user by a receiving device 101 communicatively via a media device 103 configured to receive the programming.

The receiving device 101 may interconnect to one or more communications media or sources, such as a cable head-end, satellite antenna, telephone company switch, Ethernet portal, off-air antenna, or the like, that provide the programming. The receiving device 101 commonly receives a plurality of programming by way of the communications media or other sources. Based upon selection by the user, the receiving device 101 processes and communicates the selected programming to the media device 103.

The receiving device 101 may include devices such as a "television converter," "receiver," "set-top box," "television receiving device," "television receiver," "television recording device," "digital video recorder (DVR)," "satellite set-top box," "satellite receiver," "cable set-top box," "cable receiver," "media player," "Internet streaming device," "television tuner," "media receiver," and/or "media playback device." Accordingly, the receiving device 101 may be any suitable converter device or electronic equipment that is operable to receive and/or play programming. Further, the receiving device 101 may itself include user interface devices, such as buttons, switches and displays. In many applications, a remote-control device 105 is operable to control the media device 103 and communicate with the receiving device 101.

Examples of a media device 103 include, but are not limited to, a television ("TV"), a personal computer ("PC"), a monitor, a touch screen, a game system, radio, surround-sound system, sound bar, speaker system, or the like. A media device 103 may employ one or more speakers (not shown) and/or other output devices to communicate video and/or audio content to a user (not shown). In many implementations, one or more media devices 103 reside in or near the environment 100 and are communicatively coupled, directly or indirectly, to the receiving device 101. Further, the receiving device 101 and the media device 103 may be integrated into a single device. Such a single device may have the functionality of the receiving device 101 described herein and the media device 103, or may even have additional functionality.

Although the FIG. 1 includes a media device 103, embodiments are not so limited and other media devices that may communicate with the receiving device 101 may be present or included in the environment 100. Examples of such devices include: radios, video game systems or consoles, audio systems, and other media devices.

Environment 100 may include other devices that are communicatively coupled to the receiving device 101, a communication system (not illustrated), or some combination thereof via a suitable media. For example, some environments 100 include an optional network, communication system or networked system (not shown), to which receiving device 101 and media device 103 can be coupled, collectively referred to as endpoint devices. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Consumer Electronics Control (CEC) communication system or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax") devices, or the like, may be communicatively coupled to the network or to each other so that the plurality of endpoint devices are communicatively coupled together. Thus, such a network allows the interconnected endpoint devices, and the receiving device 101, to communicate with each other.

A hand-held remote-control device 105 may provide an interface between the receiving device 101 and a user, the media device 103 and a user, the media device 103 and the receiving device 101, or some combination thereof. Remote-control device 105 typically communicates with the receiving device 101 using a suitable wireless medium, such as infrared ("IR"), radio frequency ("RF"), or the like and may be any wireless handheld device, including a mobile device such as a cellular telephone or a tablet device. Other input or control devices (not shown) may also be communicatively coupled to the receiving device 101. Non-limiting examples include game device controllers, keyboards, touch pads, touch screens, pointing devices and the like. The remote-control device 105 may also control other devices such as the media device 103 and/or other endpoint devices (not shown). The remote-control device 105 may be a "universal" remote or otherwise programmable or configurable by a manufacturer, user, and/or other device to control such other devices.

In some embodiments, the remote-control device 105 may be a multibrand remote that comes to the user preprogrammed with the codes to operate a number of standard home electronic devices. Such a remote may be able to control multiple devices and, in some embodiments, control their main functions, such as channel turning, volume control and other functions. The remote-control device 105 may also be a "learning" remote. In particular, while the remote-control device 105 may be preprogrammed to operate a number of popular electronic models, it may also have the ability to learn the functions of the original manufacturer's remote of each device. For example, this may be accomplished by placing the remote-control device 105 head-to-head with the device's original manufacturer's remote and infrared signals will be transmitted to the learning remote that allow it to duplicate the other remote's commands. Such learning can also be accomplished via RF or wired communication between remote-control devices and/or other devices.

In some embodiments, the remote-control device 105 can receive signals from the receiving device 101. In many such embodiments, the remote-control device 105 can also execute instructions contained in the signals received from the receiving device 101, such as to transmit one or more signals to the media device 103 or another media device. In some embodiments, the remote-control device is optional, and the functions of the media device control system described herein are able to be implemented without the remote-control device.

Figure 2:
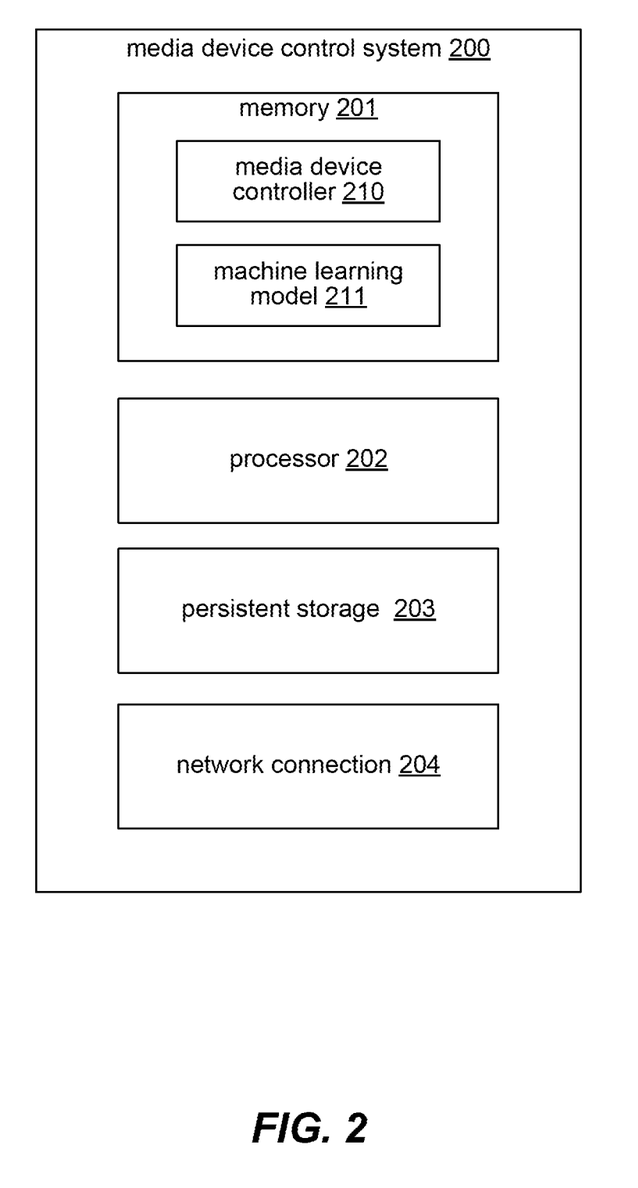
FIG. 2 is a block diagram depicting example components incorporated in a media device control system 200, according to various embodiments described herein.

FIG. 2 is a block diagram depicting example components incorporated in a media device control system 200, according to various embodiments described herein. The media device control system 200 may be included in one or more media devices (e.g., media device 103 in FIG. 1), one or more receiving devices (e.g., receiving device 101 in FIG. 1), one or more remote-control devices (e.g., remote-control device 105 in FIG. 1), one or more other computing devices, one or more servers, or some combination thereof.

In various embodiments, the media device control system 200 includes one or more of the following: a computer memory 201, a processor 202, a persistent storage device 203, and a network connection 204. The memory 201 may be used for storing programs and data while they are being used, including data associated with the various signals (not shown), radio base stations, user devices, interfering devices, an operating system including a kernel (not shown), and device drivers (not shown). The processor 202 may be used for executing computer programs (not shown), such as computer programs which perform some or all of the functions of the interference mitigation system. In some embodiments, the processor 202 may be one or more processors, microcontrollers, or other computer components used for executing computer instructions. In some embodiments, any of the processors, microcontrollers, or other computer components, either alone or in combination, can perform any of the functions or acts described herein. The persistent storage device 203 may be a hard drive or flash drive for persistently storing programs and data. The network connection 204 may be used for connecting to one or more radio base stations or other computer systems (not shown), to send or receive data, such as via the Internet or another network and associated networking hardware, such as switches, routers, repeaters, electrical cables and optical fibers, light emitters and receivers, radio transmitters and receivers, and the like, and to scan for and retrieve signals associated with media devices, receiving device, and remote-control devices. In various embodiments, the media device control system 200 additionally includes input and output devices, such as a keyboard, mouse, display devices, etc.

While a media device control system 200 configured as described may be used in some embodiments, in various other embodiments, the media device control system 200 may be implemented using devices of various types and configurations, and having various components. The memory 201 may include a media device controller 210, which contains computer-executable instructions that, when executed by the processor 202, cause the interference mitigation system 200 to perform the operations and functions described herein. For example, the programs referenced above, which may be stored in computer memory 201, may include or be comprised of such computer-executable instructions. The memory 201 may also include a machine learning model 211, that is trained to predict when a user is likely to be away from home.

The media device controller 210 performs the core functions of the media device control system 200, as discussed herein and also with respect to FIGS. 3-6. In particular, the media device controller 210 predicts whether a user is likely to be away from home at a future time and, after receiving a confirmation that the user will be away from home at the future time, controls one or more media devices while the user is away from home. Additionally, the media device controller 210 may train the machine learning model 211 to predict when a user is likely to be away from home. The media device controller 210 may also perform other functions related to determining or predicting whether a user will be away from home and controlling media devices while the user is away.

In an example embodiment, the media device controller 210 or computer-executable instructions stored on memory 201 of the media device control system 200 are implemented using standard programming techniques. For example, the media device controller 210 or computer-executable instructions stored on memory 201 of the media device control system 200 may be implemented as a "native" executable running on processor 202, along with one or more static or dynamic libraries. In other embodiments, the media device controller 210 or computer-executable instructions stored on memory 201 of the media device control system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single processor computer system, or alternatively decomposed using a variety of structuring techniques known in the art, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the media device controller 210.

In addition, programming interfaces to the data stored as part of the media device controller 210 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The media device controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the media device control system 200.

Furthermore, in some embodiments, some or all of the components/portions of the media device controller 210, or functionality provided by the computer-executable instructions stored on memory 201 of the media device control system 200 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of receiving devices, media devices, remote-control devices, media control system, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The operation of certain aspects will now be described with respect to FIGS. 3-6. In at least one of various embodiments, processes 400, 500, and 600 described in conjunction with FIGS. 4-6, respectively, may be implemented by one or more processors or executed via circuitry on one or more computing devices, such as the media device control system 200 described in connection with FIG. 2. In at least one of various embodiments, the data table 300 described in conjunction with FIG. 3 is an illustration of how data used by a media device control system may be accessed or stored.

Figure 3:
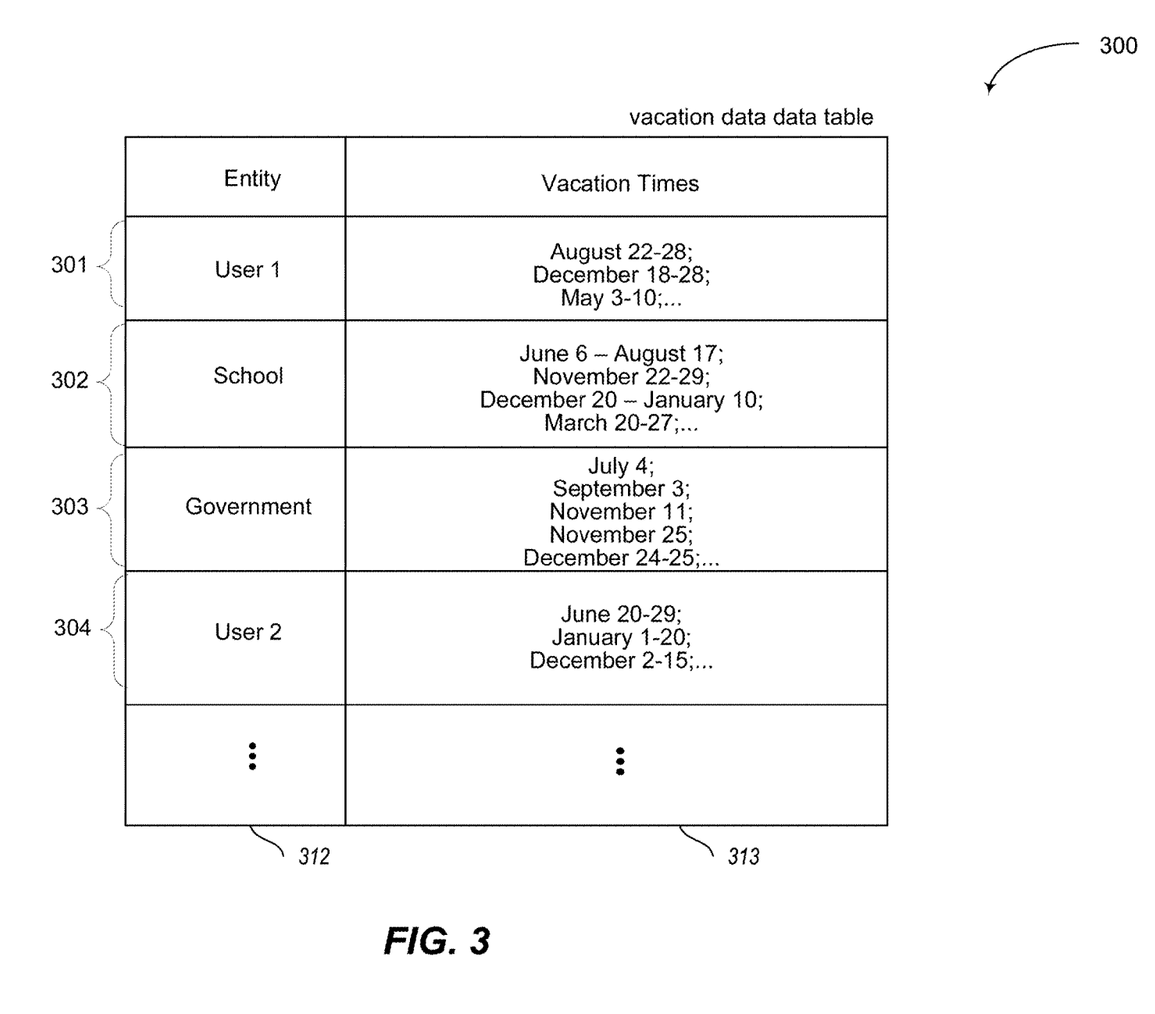
FIG. 3 is a table diagram depicting a sample vacation data data table 300, according to various embodiments described herein.

FIG. 3 is a table diagram depicting a sample vacation data data table 300, according to various embodiments described herein. The table 300 include sample data that is in human-readable form and implementations of the interference mitigation system may include data in other forms. Furthermore, the table 300 is non-exhaustive, and implementations of the media device control system may include additional data, rows, columns, etc., which are not shown in FIG. 3.

The table 300 includes an entity column 312, a vacation times column 313, and rows 301, 302, 303, and 304. The entity column 312 includes information specifying an entity for which vacation time data has been obtained. In some embodiments, an entity may be a user, including a user of a receiving device and other users within a geographic area that includes the receiving device, an institution, such as a school, school district, government, corporation, or other institution, or other entities that may specify one or more times at which a user is likely to be away from the geographic area within which a receiving device associated with the user is located. The vacation times column 313 includes information specifying one or more vacation times for the entities specified in the entity type column 312.

In some embodiments, a media device control system, such as the media device control system 200, accesses vacation data associated with the entities specified in the table 300. For example, in some embodiments the media device control system accesses a data repository of vacation times for each entity. In another example, the media device control system accesses one or more webpages, databases, or other data sources associated one or more entities to obtain the vacation time data. In yet another example, the media device control system accesses vacation time data representing times that one or more users in a geographic area have taken vacations or have been otherwise absent from their homes.

In yet another example, the media device control system identifies one or more times at which a media device associated with a receiving device is off or inactive for a period of time that exceeds a threshold amount of time. For example, the media device control system may determine that a television was off for a week in July, and may thus determine that the user was on vacation during that week.

Each row in the table 300 includes data related to vacation times specified by an entity identified in the entity column 312. As an example, row 301 indicates that a user of a receiving device was absent from their home from August 22 to August 28, December 18 to December 28, and May 3 to May 10. As another example, row 302 indicates that a school located within a geographic area that includes a receiving device has holidays from June 6 to August 17, November 22 to November 29, December 20 to January 10, and March 20 to March 27. As yet another example, row 303 indicates that the government holidays are on July 4, September 3, November 11, November 25, and December 24 and 25.

Figure 4:
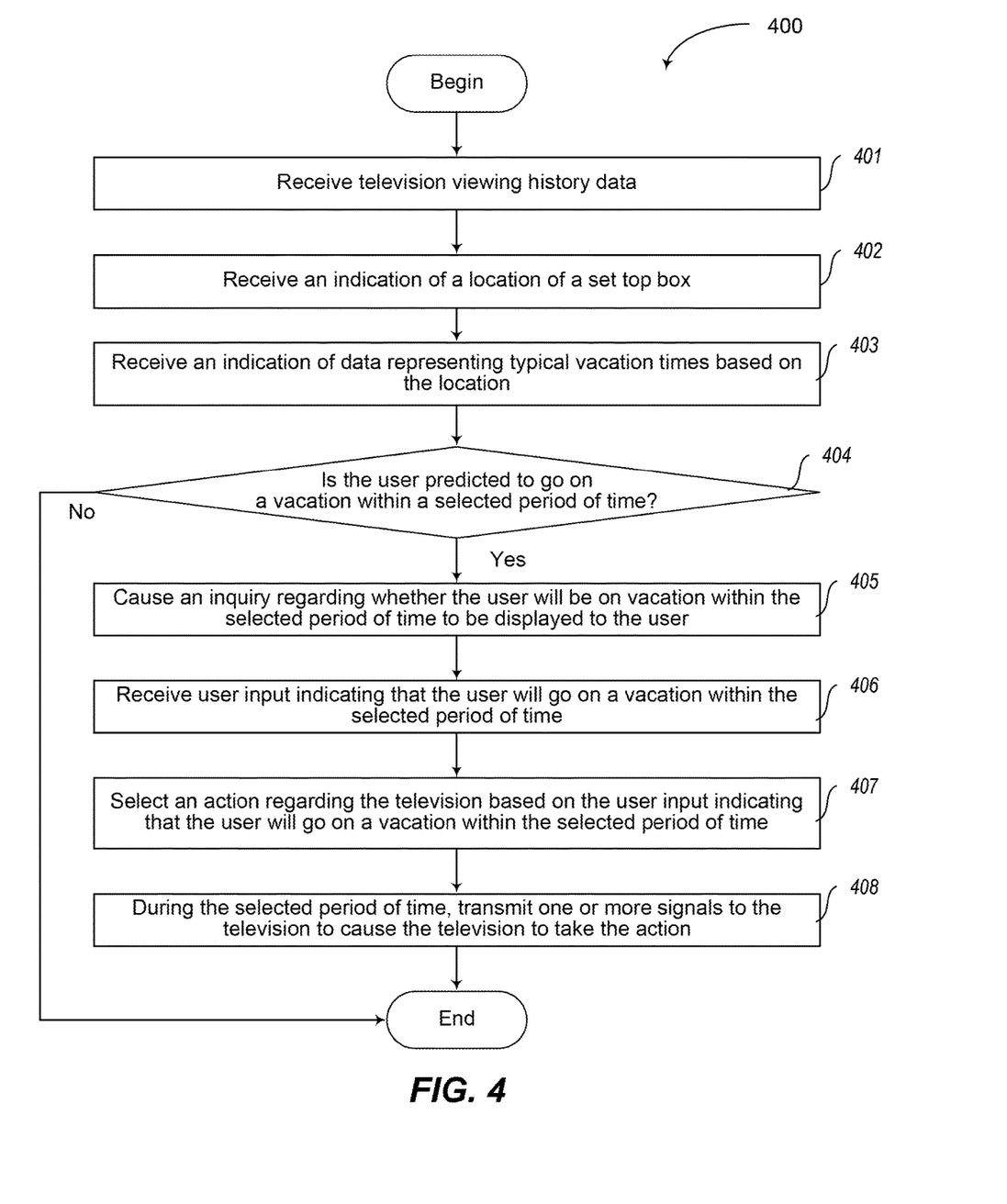
FIG. 4 is a flow diagram of a process 400 used to cause a television to be activated during a selected period of time during which a user of the television is not within the premises that includes the television, according to various embodiments described herein.

FIG. 4 is a flow diagram of a process 400 used to cause a television to be activated during a selected period of time during which a user of the television is not within the premises that includes the television, according to various embodiments described herein. The process 400 may be performed by a media device control system, such as the media device control system 200 described above with respect to FIG. 2. Although the process 400 is described as being performed in relation to a television and set-top box, embodiments are not so limited, and the process 400 may be performed for any media device in communication with a receiving device associated with the customer. In some embodiments, the set-top box is configured to cause the television device to display media content obtained by the set-top box. In some embodiments, the set-top box and television are associated with the same user.

The process 400 begins, after a start block, at act 401, where the media device control system receives television viewing history data. In some embodiments, television viewing history data includes one or more times at which the television was off or inactive for greater than a threshold amount of time.

The process 400 proceeds to act 402, where the media device control system receives an indication of a location, also referred to as a geographic location, of a set-top box or other type of receiving device. In some embodiments, the location is one or more of: a GPS location, an address, or another type of indication of a location. In some embodiments, the media device control system receives the indication of the location of the set-top box from one or more of: a location determination system, such as a GPS system, integrated in or in communication with the set-top box; a query to an entity that stores location data associated with a user or set-top box; or other methods of obtaining a location of a set-top box.

The process 400 proceeds to act 403, where the media device control system receives an indication of data representing typical vacation times based on the location. In some embodiments, the data representing typical vacation times may include vacation times of one or more entities that are located within a threshold distance from the location of the set-top box. For example, the typical vacation times may include school days off of each school within a 10 mile radius of the location of the set-top box. In some embodiments, the media device control system can utilize a database of entities and their locations to identify those entities within the threshold distance from the location of the set-top box. Once identified, the media device control system can access or query those identified entities for their vacation time data. In some embodiments, the geographic area may be defined as an area within a threshold distance from the location of the set-top box, which may be set by the user or an administrator. In other embodiments, the geographic area may be defined based on entities associated with the user or the user's family, such as place of employment of the user or spouse, schools attended to by the user's children, etc. In some embodiments, the set-top box receives an indication of the data representing typical vacation times of the user from one or more of: calendar entries; state or local holidays; historical vacation times of the user; or other sources of vacation time data.

The process 400 proceeds to act 404, where the media device control system predicts whether the user will go on vacation, or otherwise be away from the location of the set-top box, within a selected period of time. In some embodiments, the media device control system predicts whether the user will go on vacation based on the television viewing history data, the data representing typical vacation times based on the location, or some combination thereof. In some embodiments, the selected period of time is a period of time that encompasses the current date and a date in the future. For example, the media device control system may select a one month period of time and predict whether the user will be on vacation within that one month period of time.

If the user is not predicted to go on a vacation or otherwise be away from the location of the set-top box within the selected period of time, the process 400 ends. Otherwise, the process 400 proceeds to act 405.

At act 405, the media device control system causes an inquiry to be displayed to the user. The inquiry requests that the user provide input regarding whether the user will be on vacation or otherwise be away from the location of the set-top box within the selected period of time. In some embodiments, causing the inquiry to be displayed to the user includes transmitting a signal to a device, such as a media device, computing device, smartphone, telephone, or other devices, associated with the user instructing the device to present the inquiry to the user. In some embodiments, the media device control system displays the inquiry to the user.

The process 400 proceeds to act 406, where the media device control system receives user input indicating that the user will go on a vacation or otherwise be away from the location of the set-top box within the selected period of time. In some embodiments, the user can respond to the inquiry by inputting an indication of one or more times at which the user will be on vacation or otherwise away from the location of the set-top box. In some embodiments, the user input is received before act 405, such as by including a user interface or other method of obtaining user input that can receive user input indicating a time period during which the user desires that the media device control system will control the television. In such embodiments, the media device control system may proceed to act 407 from any one of acts 401-406. In some embodiments, the media device control system receives the user input via one or more of: the set-top box, a smartphone associated with the user, the television, the remote-control device, or any other computing device that is able to obtain user input from the user.

The process 400 proceeds to act 407, where the media device control system selects an action regarding the television based on the user input indicating that the user will go on vacation or otherwise be away from the location of the set-top box within the selected period of time. In some embodiments, the action includes activating the television for one or more periods of time within the selected period of time. In some embodiments, the action includes changing one or more settings of the television, such as volume settings, display settings, or other television settings, within the selected period of time.

In some embodiments, the media device control system selects the action based on television viewing history of the user. The television viewing history may include one or more of: one or more channels that the user has watched; one or more times that the user has watched one or more channels; usage history of one or more additional media devices; a location of the set-top box; one or more attributes of the user or other people residing in the household, such as an age, gender, occupation, or other attributes of a person; one or more media content viewing habits of users that reside in the home; one or more media device settings, such as volume settings, display settings, etc.; or other data indicating viewing or usage history of a television or other media content device. In such embodiments, the media device control system may use the television viewing history as training data to train an artificial intelligence or machine learning model to select an action for a television or other media content device. In some embodiments, the action includes a time at which the action is taken. In some embodiments, the media device control system generates a list of actions based on the television viewing history. In such embodiments, the media device control system selects the action regarding the television based on the generated list of actions.

In some embodiments, the media device control system is able to control multiple media devices. In some embodiments, the media device control system uses the television viewing history to select actions for controlling multiple media devices. In some embodiment selecting actions for controlling multiple media devices includes activating or deactivating media devices at one or more times. For example, if the user watches a television on the first floor of their home from 3:00 pm-7:00 pm and another user watches a second television on the second floor of the home from 5:00 pm-10:00 pm, the media device control system may activate the first television during the selected period of time from 3:00 pm-7:00 pm and the second television from 5:00 pm-10:00 pm.

In some embodiments, the media device control system uses the television viewing history to select one or more channels, streaming services, etc. In such embodiments, the selected action may include causing the television to display a selected channel or streaming service. In some embodiments, the channel or streaming service may be selected based on a time that the user typically watches the channel or streaming service.

For example, in a home with two televisions and an audio system, the television viewing history may indicate that users in the home typically view the first television between 3:00 pm and 10:00 pm, view the second television between 6:00 pm and 12:00 am, and use the audio system from 9:00 am to 1:00 pm. The television viewing history may also indicate that on a certain day of the week the first television is used to watch channel 7 from 3:00 pm to 6:00 pm and channel 9 from 6:00 pm to 10:00 pm, and that the volume of the first television is lowered when switching between channels 7 and 9. In this example, the media device control system may use the television viewing history learn these viewing patterns, such as by training an artificial intelligence or machine learning model by using the television viewing history as training data. The media device control system uses the artificial intelligence or machine learning model to select actions for controlling the first television, second television, and audio system during the selected period of time.

The process proceeds to act 408, where, during the selected period of time, the media device control system transmits one or more signals to the television to cause the television to take the action. In some embodiments, the media device control system transmits the signals at a time that the user indicated that they would be on vacation or otherwise away from the location of the set-top box. In this way, the media device control system can turn the television on or off for specific periods of time while the user is on vacation or otherwise away from the location of the set-top box.

After act 408, the process 400 ends. In some embodiments, the media device control system performs some or all of the process 400 periodically, such as monthly, weekly, quarterly, yearly, etc. For example, the media device control system may perform acts 404-408 monthly, acts 401-408 yearly, etc. In other embodiments, the media device control system may perform some or all of the process 400 at select times, such as in response to a change in the user's schedule or a release of an entity vacation calendar.

Figure 5:
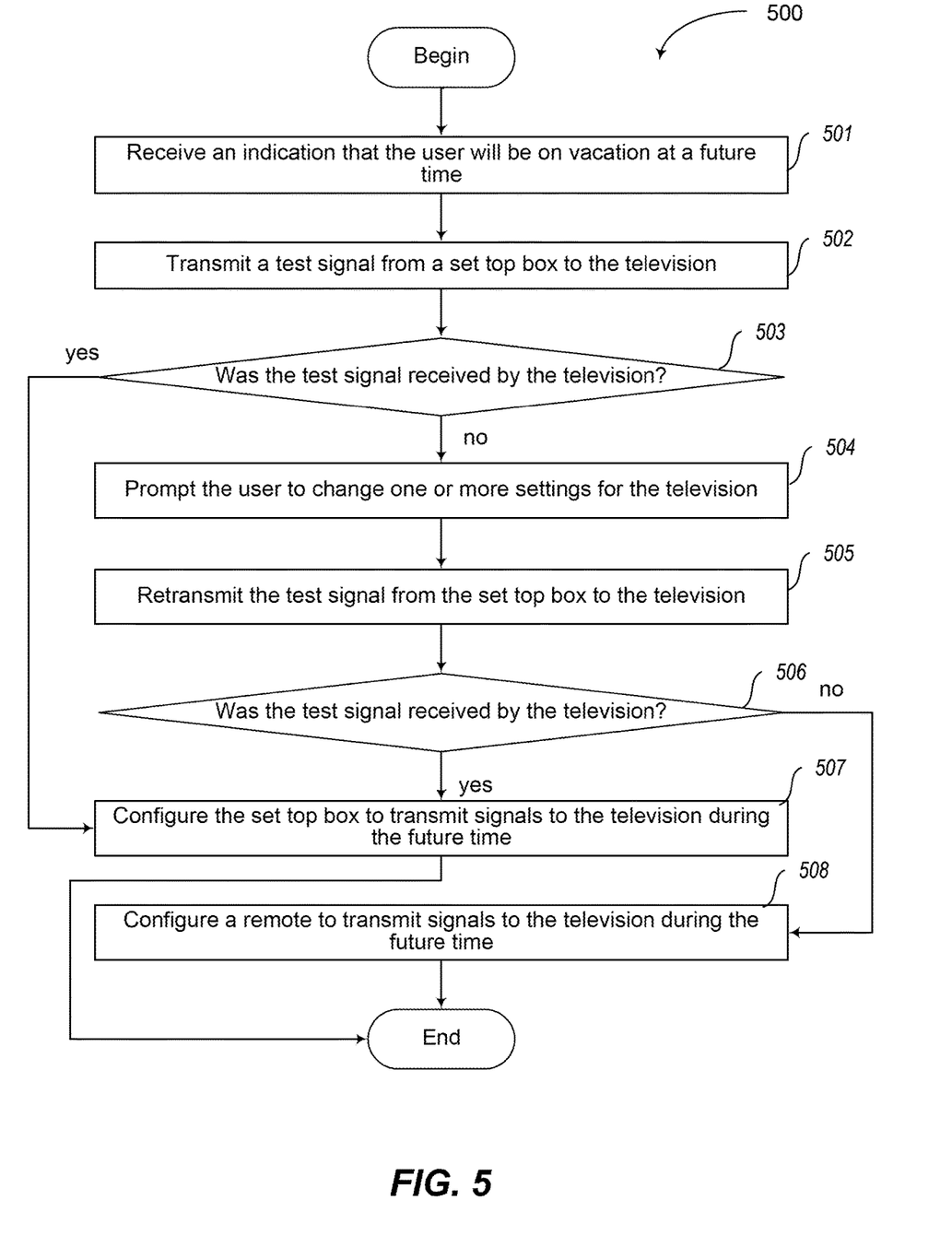
FIG. 5 is a flow diagram of a process 500 used to configure a television to receive signals from a receiving device, such as a set-top box, to activate the television, according to various embodiments described herein.

FIG. 5 is a flow diagram of a process 500 used to configure a television to receive signals from a receiving device, such as a set-top box, to activate the television, according to various embodiments described herein. Although the process 500 is described as being performed in relation to a television, embodiments are not so limited, and the process 500 may be performed for any media device in communication with a receiving device associated with the customer.

The process 500 begins, after a start block, at act 501, where the media device control system receives an indication that the user will be on vacation at a future time. In some embodiments, some or all of the process 400 is used to determine whether the user will be on vacation at the future time.

The process 500 proceeds to act 502, where the media device control system causes a signal to be transmitted from a set-top box, or another type of receiving device, to the television. In some embodiments, the test signal includes instructions to activate the television, such as to turn the television on, to adjust a channel or volume setting of the television, to display a message on the television, to prompt the television to transmit a signal to the media device control system or a receiving device, or other instructions that a media device control system may transmit to a television. In some embodiments, the test signal is transmitted by using the Consumer Electronics Control protocol for HDMI devices (CEC protocol).

The process 500 proceeds to act 503, where the media device control system determines whether the test signal was received by the television. In some embodiments, to determine whether the test signal was received by the television, the media device control system determines whether the television sent a signal back to the media device control system or to the receiving device. In some embodiments, to determine whether the test signal was received by the television, the media device control system prompts a user to confirm whether the test signal was received by the television. If the test signal was received by the television, the process proceeds to act 507, otherwise the process proceeds to act 504.

At act 504, the media device control system prompts the user to change one or more settings for the television. These settings may include allowing or permitting the television to use one or more communications protocols, such as a CEC protocol.

The process 500 proceeds to act 505, where the media device control system causes the test signal to be retransmitted from the set-top box to the television after the user has changed the one or more settings for the television. In some embodiments, act 505 is performed in a similar manner to act 502.

The process 500 proceeds to act 506, where the media device control system determines whether the retransmitted test signal was received by the television. In some embodiments, the act 506 is performed in a similar manner to act 503. If the test signal was received by the television, the process proceeds to act 507, otherwise the process proceeds to act 508.

At act 507, the media device control system configures the set-top box to transmit signals to the television during the future time. In some embodiments, to configure the set-top box to transmit signals to the television during the future time, the media device control system, during the future time, transmits one or more signals to the set-top box instructing the set-top box to transmit signals to the television.

At act 508, the media device control system configures a remote-control device to transmit signals to the television during the future time. In some embodiments, the media device control system configures the remote-control device by configuring a set-top box to transmit signals that instruct the remote-control device to transmit signals to the television. In some embodiments, to configure the remote-control device the media device control system, during the future time, transmits one or more signals to the set-top box or the remote-control device, to cause the remote-control device to transmit signals to the television.

After act 507 or 508, the process 500 ends.

Figure 6:
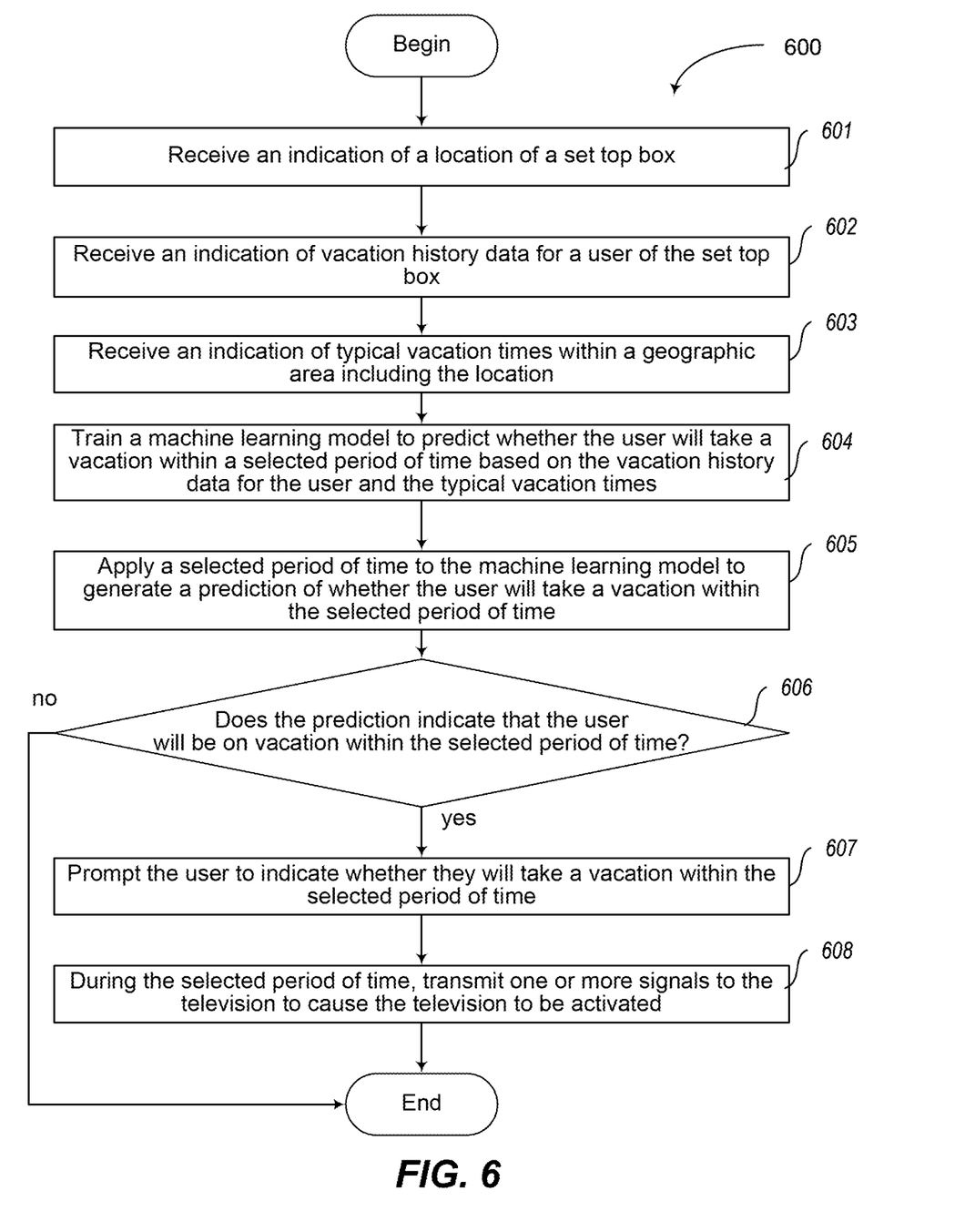
FIG. 6 is a flow diagram of a process 600 used to train and use a machine learning model to predict when a user will be on vacation or otherwise away from the location of the set-top box and to control a television while the user is away, according to various embodiments described herein.

FIG. 6 is a flow diagram of a process 600 used to train and use a machine learning model to predict when a user will be on vacation or otherwise away from the location of the set-top box and to control a television while the user is away, according to various embodiments described herein. Although the process 600 is described as being performed in relation to a television, embodiments are not so limited, and the process 600 may be performed for any media device in communication with a receiving device, such as a set-top box, associated with the user.

The process 600 begins, after a start block at act 601, where the media device control system receives an indication of a location of a set-top box or other type of receiving device. In some embodiments, act 601 is performed in a similar manner to act 402 in FIG. 4.

The process 600 proceeds to act 602, where the media device control system receives an indication of vacation history data for a user of the set-top box. In some embodiments, the media device control system uses television viewing history data to receive or obtain vacation history data for the user. For example, the vacation history data for the user may include data regarding one or more times at which the television device is off or inactive for a period of time that exceeds a threshold amount of time. In some embodiments, the vacation history data includes an indication of previous times that the user has indicated to the media device control system that they were on vacation. In some embodiments, the previous times that the user device has indicated that they were on vacation are one or more of: times included in a calendar associated with the user; times that the user has previously instructed the media device control system to control the television; or other sources that store times that the user has indicated that they were on vacation. In some embodiments, at least a portion of the vacation history data is received via user input.

The process 600 proceeds to act 603, where the media device control system receives an indication of typical vacation times within a geographic area including the location of the set-top box. In some embodiments, act 603 is performed in a similar manner to act 403.

The process 600 proceeds to act 604, where the media device control system trains a machine learning model to predict whether the user will take a vacation or otherwise be away from the location of the set-top box within a selected period of time. In some embodiments, a device that generates the machine learning model is different than the device that uses the machine learning model. For example, the media device control system may generate the model and the set-top box may use the model to determine whether the user will be away from the location of the set-top box within the selected period of time. In various embodiments, the media device control system trains a machine learning model by using the vacation history data for the user and the typical vacation times as training data, which outputs a model that predicts whether the user will take a vacation or otherwise be away from the location of the set-top box for a selected period of time.

The process 600 proceeds to act 605, where the media device control system applies a selected period of time to the machine learning model to generate a prediction of whether the user will take a vacation or otherwise be away from the location of the set-top box within the selected period of time.

The process 600 proceeds to act 606, where the media device control system determines whether the prediction indicates that the user will be on vacation or otherwise be away from the location of the set-top box within the selected period of time. If the prediction indicates that the user will not be on vacation or away from the location of the set-top box within the selected period of time, the process 600 ends, otherwise, the process 600 proceeds to act 607.

At act 607, the media device control system prompts the user to indicate whether they will take a vacation within the selected period of time. In some embodiments, the media device control system performs act 607 in a similar manner to acts 405 and 406 of FIG. 4 to provide an inquiry to the user and receive a user input responding to the inquiry.

At act 608, the media device control system, during the selected period of time, transmits one or more signals to the television to cause the television to be activated. In some embodiments, the media device control system performs act 608 in a similar manner to acts 407 and 408.

After act 608, the process 600 ends. In some embodiments, the media device control system performs some or all of the process 600 periodically, such as monthly, weekly, quarterly, yearly, etc. For example, the media device control system may perform acts 605-608 monthly, acts 601-608 yearly, etc. In some embodiments, the media device control system re-trains the machine learning model with additional vacation time data.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
 at least one processor; and
 at least one memory coupled to the at least one processor, the memory having computer-executable instructions stored thereon that, when executed by the at least one processor, cause the system to:
  receive a first indication of a geographic location of a set-top box associated with a user;
  receive a second indication of data representing one or more vacation time periods based on the geographic location;
  determine, based on the data representing the one or more vacation time periods and the geographic location, that the user is predicted to be on vacation within a period of time;
  based on the determination that the user is predicted to be on vacation within the period of time, receive user input indicating that the user will go on vacation within the period of time; and
  during the period of time, cause the set-top box to transmit one or more signals activating a television based on the user input indicating that the user will go on vacation within the period of time.

2. The system of claim 1, wherein to cause the set-top box to transmit one or more signals activating the television, the computer-executable instructions, when executed by the at least one processor, further cause the system to:
 access television viewing history of the user;
 select one or more media channels based on the television viewing history of the user; and
 transmit one or more signals to the television to cause the television to display the selected one or more media channels.

3. The system of claim 1, wherein the computer-executable instructions, when executed by the at least one processor, further cause the system to:
 train a machine learning model to predict whether the user will be on vacation during a period of time based on the data representing the one or more vacation time periods.

4. The system of claim 3, wherein, to determine that the user is predicted to be on vacation within the period of time, the computer-executable instructions, when executed by the at least one processor, further cause the system to:
 apply the period of time to the machine learning model to obtain a prediction of whether the user will be on vacation within the period of time.

5. The system of claim 1, wherein, to receive the second indication of data representing one or more vacation time periods, the computer-executable instructions, when executed by the at least one processor, further cause the system to:
 identify one or more entities based on the geographic location; and
 for each entity of the one or more entities, access data representing one or more time periods during which the entity will be closed.

6. The system of claim 1, wherein, to receive the second indication of data representing one or more vacation time periods, the computer-executable instructions, when executed by the at least one processor, further cause the system to:
 identify one or more other users based on the geographic location; and
 for each respective user of the one or more other users, access data representing one or more time periods during which the respective user will be on vacation.

7. The system of claim 1, wherein, the computer-executable instructions, when executed by the at least one processor, further cause the system to:
 transmit a test signal to the television; and
 determine whether the test signal was received by the television.

8. The system of claim 7, wherein, the computer-executable instructions, when executed by the at least one processor, further cause the system to:
 based on a determination that the test signal was not received by the television:
  present a prompt to a user to change one or more settings of the television; and
  re-transmit the test signal to the television.

9. The system of claim 7, wherein, the computer-executable instructions, when executed by the at least one processor, further cause the system to:
 based on a determination that the test signal was not received by the television:
  identify a remote-control device that is in communication with the television; and
 wherein, to transmit the one or more signals to activate the television, the set-top box is caused to transmit instructions to the remote-control device to transmit the one or more signals to the television.

10. The system of claim 1, wherein, the computer-executable instructions, when executed by the at least one processor, further cause the system to:
 in response to a determination that the user is predicted to be on vacation within the period of time:
  provide an inquiry to the user requesting confirmation that the user will be on vacation within the period of time.

11. A nontransitory processor-readable storage medium that stores at least one of instructions or data, the instructions or data, when executed by at least one processor, cause the at least one processor to perform a method comprising:
 receiving a first indication of a geographic location of a set-top box associated with a user;
 receiving a second indication of data representing one or more vacation time periods based on the geographic location;
 determining, based on the data representing the one or more vacation time periods and the geographic location, that the user is predicted to be on vacation within a period of time;
 based on the determination that the user is predicted to be on vacation within the period of time, receiving user input indicating that the user will go on vacation within the period of time; and
 during the period of time, causing a receiving device to transmit one or more signals activating a media device based on the user input indicating that the user will go on vacation within the selected period of time.

12. The nontransitory processor-readable storage medium of claim 11, wherein the method further comprises:
  transmitting, prior to causing the receiving device to transmit the one or more signals activating the media device, a test signal to the media device to activate the media device; and
  determining whether the test signal was received by the media device.

13. The nontransitory processor-readable storage medium of claim 12, wherein the method further comprises:
  based on a determination that the test signal was not received by the media device:
    presenting a prompt to a user to change one or more settings of the media device; and
    re-transmitting the test signal to the media device.

14. The nontransitory processor-readable storage medium of claim 12, wherein the method further comprises:
  based on a determination that the test signal was not received by the media device:
    identifying a remote-control device that is able to transmit signals to control the media device; and
    during the period of time, causing the receiving device to transmit the one or more signals activating the media device by transmitting at least one command to the remote-control device to transmit the one or more signals to the media device.

15. A method in a receiving device, the method comprising:
  receiving geographic location data representing a geographic location of the receiving device;
  receiving vacation time data based on the geographic location of the receiving device, the vacation time data indicating one or more times at which a user of the receiving device is likely to be away from the geographic location;
  determining, based on the vacation time data and the geographic location, that the user is predicted to be away from the geographic location during a period of time;
  based on the determination that the user is predicted to be away from the geographic location during the period of time, receiving user input indicating that the user will be away from the geographic location during the period of time; and
  transmitting one or more signals activating a media device based on the user input indicating that the user will be away from the geographic location during the period of time.

16. The method of claim 15, further comprising:
  accessing media content history of the user;
  selecting media content based on the media content history of the user; and
  transmitting one or more additional signals to the media device to play the selected media content.

17. The method of claim 15, wherein receiving the vacation time data further comprises:
  identifying one or more entities based on the geographic location; and
  for each entity of the one or more entities, access data representing one or more time periods during which the entity will be closed.

18. The method of claim 15, wherein, receiving the vacation time data further comprises:
  identifying one or more other users based on the geographic location; and
  for each respective user of the one or more other users, accessing data representing one or more time periods during which the respective user will be away from a geographic location of a receiving device associated with the respective user.

19. The method of claim 15, wherein, determining that the user is predicted to be away from the geographic location within the period of time further comprises:
  applying the period of time to a machine learning model trained to predict whether a user will be away from the geographic location during a period of time.

20. The method of claim 19, wherein the method further comprises:
  training the machine learning model to predict whether the user will be away from the geographic location during a period of time based on the vacation time data.

* * * * *